June 27, 1950 J. MURI 2,513,100
ANIMATED DISPLAY DEVICE
Filed April 9, 1947 4 Sheets-Sheet 1

INVENTOR.
JENS MURI
BY
*Williams, Rich & Morse*
ATTORNEYS

June 27, 1950  J. MURI  2,513,100
ANIMATED DISPLAY DEVICE
Filed April 9, 1947  4 Sheets-Sheet 2
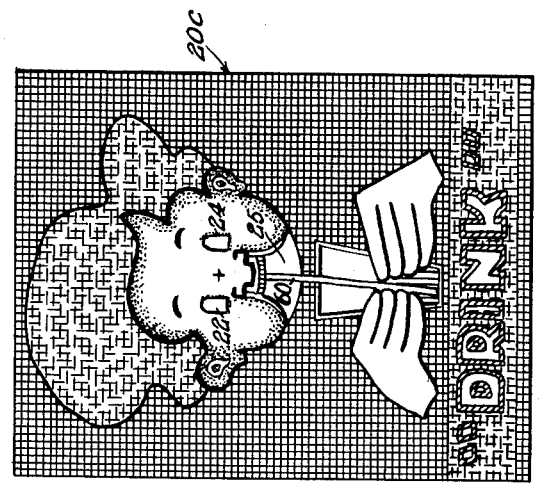
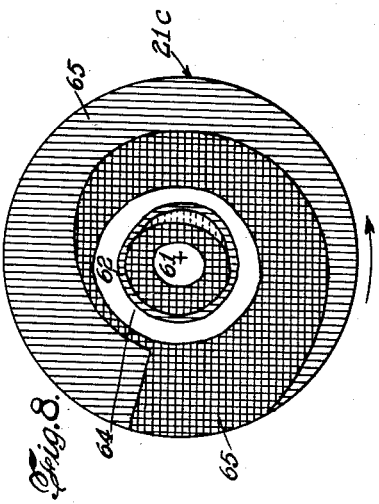
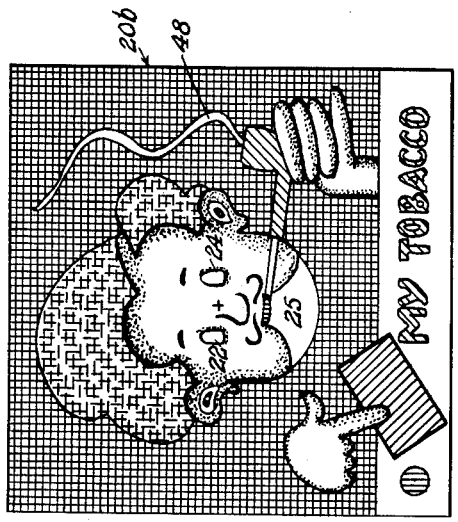
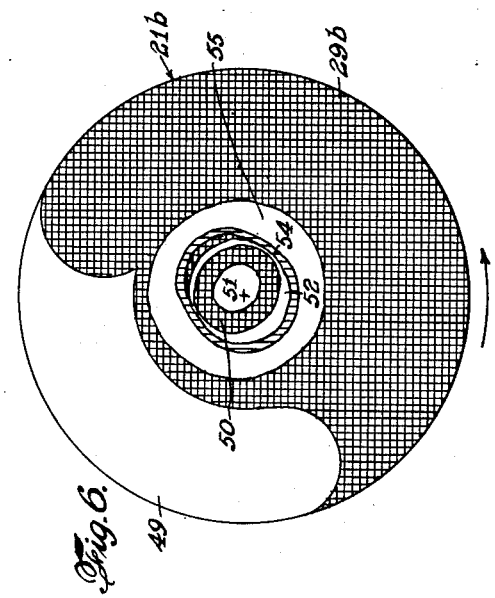
INVENTOR.
JENS MURI
ATTORNEYS June 27, 1950 — J. MURI — 2,513,100
ANIMATED DISPLAY DEVICE
Filed April 9, 1947 — 4 Sheets-Sheet 3

INVENTOR.
JENS MURI
BY Williams, Rich & Moore
ATTORNEYS

June 27, 1950            J. MURI            2,513,100
ANIMATED DISPLAY DEVICE
Filed April 9, 1947                      4 Sheets-Sheet 4
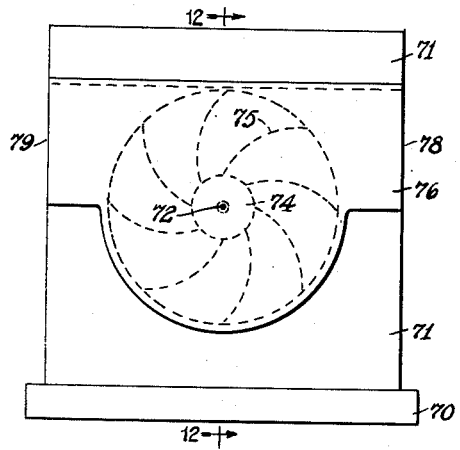
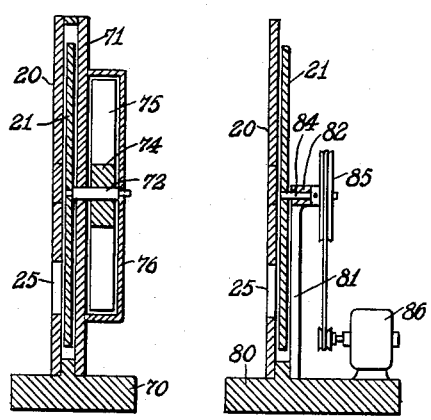
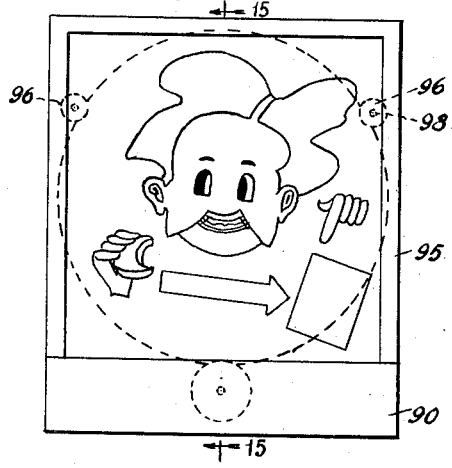
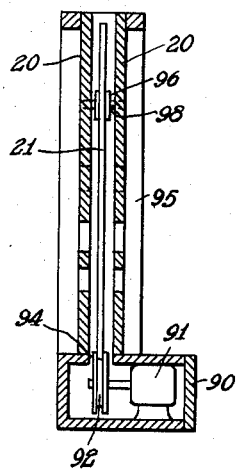
INVENTOR.
JENS MURI
BY
Williams, Rich & Morse
ATTORNEYS Patented June 27, 1950

2,513,100

UNITED STATES PATENT OFFICE 2,513,100

ANIMATED DISPLAY DEVICE

Jens Muri, Stavanger, Norway

Application April 9, 1947, Serial No. 740,291

4 Claims. (Cl. 40—34)

This invention relates to displays, more particularly to animated displays for use in advertising or other fields where it is desired to attract attention visually.

The principal objects of the invention are to provide a novel form of display which can be adapted to advertising a wide range of products, which can be easily manufactured and inexpensively operated, which can be adapted to a variety of advertising media such as counter and window displays, billboards, signs carried by vehicles and the like, and which is particularly adaptable to displays incorporating a picture or caricature of a human or animal head or face, the expression of which is changed or animated. Other objects and advantages will in part appear and in part will be obvious from the following description of various embodiments of the invention, taken in conjunction with the drawings in which:

Fig. 5 shows a panel carrying a picture of a man smoking a pipe, with apertures at the eye and lower jaw portions and above the pipe, behind which rotates a disc, shown in Fig. 6, to produce animation of the eyes and mouth of the figure and intermittent upward movement of a curl of smoke above the pipe;

Fig. 7 shows a panel carrying the picture of a figure drinking from a glass through a straw or tube, apertures being provided at the eye and lower jaw portions of the face and at the upper part of the glass, behind which apertures rotates a disc, shown in Fig. 8, to change the facial expression of the figure and create the appearance of the repeated emptying of fluid from the glass;

Fig. 9 shows the display figure with the mouth in closed position and the arrow de-emphasized by being blended with the background and Fig. 10 shows the same display with the mouth fully opened, the arrow emphasized and the eyes in a different position from that shown in Fig. 9.

Fig. 11 is a rear elevation of a sign adapted for wind operation;

Fig. 12 is a central section taken on the line 12—12 of Fig. 11;

Fig. 13 is a central elevation through a motor-driven sign in which the rotatable disc is mounted on a central pivot;

Fig. 14 is a front elevation of another form of sign in which the rotatable disc is supported and driven at its periphery; and Fig. 15 is a central section taken on the line 15—15 of Fig. 14.

Figure 3:
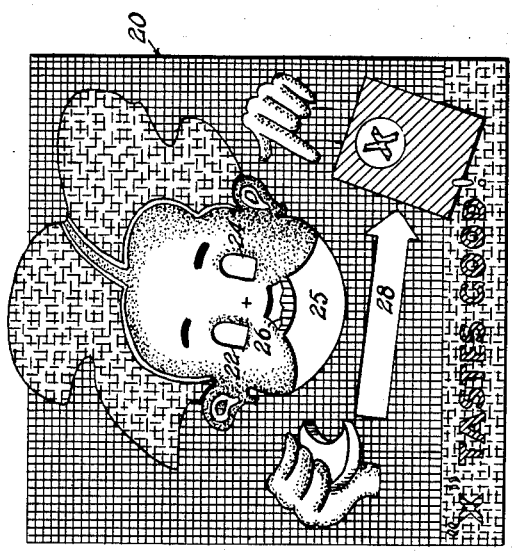
Fig. 3 shows a similar panel having apertures at the eye portions, upper head portion and lower jaw portion of the figure of a head and a star-shaped background aperture behind which rotates a disc, shown in Fig. 4, to produce apparent movement of the top of the head, the lower jaw and the eyes, associated with periodic appearance of a star.

The principles of the invention will best be understood by reference to the structure shown in Figs. 1, 2, 9 and 10. The two principal parts of the display are a front plate or panel 20 and a rotatable disc or rear plate 21. These two parts are mounted on suitable standards or supports so that the rear plate is immediately behind the panel. Various methods of mounting these parts will be hereinafter described.

The panel 20 is shown as bearing a stylized picture of the major portions of a human face, this panel having apertures 22 and 24 cut in it at the location of the eyes and an aperture 25 at the location of the lower jaw. The upper lip 26 is included as a part of this picture and forms the upper margin of aperture 25. Underneath the face is a further aperture 28 in the shape of an arrow intended to direct attention to advertising matter or the like on the panel.

The center of rotation of plate 21 is marked with a cross and its position relative to panel 20 is similarly marked on the latter at a point between the eye apertures 22 and 24.

Plate 21 is so colored as to animate the figure on the panel 20 as to its eyes, which appear behind the apertures 22 and 24, and as to the lower jaw, which is encompassed by the aperture 25. The eyes are given a rolling motion and the jaw is given an apparent up and down motion when the plate 21 is continuously rotated. Simultaneously, the aperture encompassed by the arrow 28 is made to appear and disappear by the successive positioning behind this aperture of a color which contrasts with and a color which is the same as the color of the background surrounding aperture 28. For example, the background color may be black, as shown, and an area 29 extending about half way around the outside portion of plate 21 is correspondingly colored black. The remainder of the outside portion is colored red as shown at 30 by conventional hatching. Any other color contrasting with the background could be used. These two portions have to do only with the arrow. As plate 21 rotates, the color behind the aperture 28 will be alternately black and red.

To produce the rolling motion of the eyes, plate 29 carries around its center of rotation, and eccentric with respect thereto, a continuous band 31 of black or other dark color which has a width somewhat narrower than the eye apertures 22 and 24. This band 31 is surrounded on either side by light colored areas, for example white portions 32 and 34. Due to the eccentricity of this band 31, the eyes appear to move with a rolling motion when plate 21 rotates. Two different positions are shown in Figs. 9 and 10.

The simulation of lower jaw movement is produced upon rotation of plate 21 by other bands of contrasting color which are also eccentrically disposed. The outermost band or area 35 has a color matching the face and forms the chin and lower portion of the jowls. Preferably, it varies in thickness as well as being eccentrically located, its thickest portion being that part which is closest to the center of rotation. Around the inner margin of this band of color is another band 36 colored red to represent the lower lip and inwardly of this red band is a continuous dark band 38 which has a considerable variation in width and represents the shadow area inside the mouth.

Figure 9:
Figs. 9 and 10 are two views of the display resulting from the assembly of the panel of Fig. 1 and the disc of Fig. 2.
Figure 10:

Referring now to Figs. 9 and 10, Fig. 9 shows the plate 21 rotated into a position in which its black marginal portion 29 falls behind the arrow opening 28 so that the arrow is practically invisible. In this position those parts of the bands 35, 36 and 38 which are closest to the center of rotation are occupying the aperture 25 so that the mouth appears to be closed. A portion of the black area 29 surrounding the outer margin of the band 35 also underlies a portion of the lower part of aperture 25 so that the chin is elevated.

In Fig. 10 the same display is shown with the rear plate 21 rotated about 180° from the position shown in Fig. 9 so that the red area 30 falls underneath the arrow and those portions of bands 35, 36, 38 and 34 which are farthest from the center of rotation occupy the lower jaw aperture giving the display an open mouth appearance.

When the plate 21 is rotated at a relatively slow speed, as for example one revolution per second, the eccentric and linear movement of the continuous color bands gives to the face a realistic appearance of chewing. The band 31 makes the eyes roll. At the same time, the arrow is made to appear and disappear to attract further attention to a particular part of the display.

Figure 4:
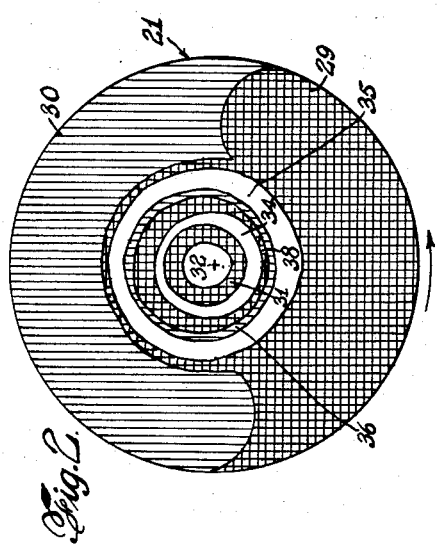
Figure 1:
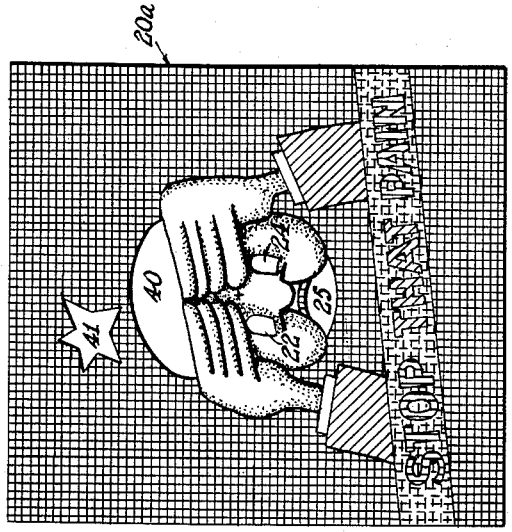
Fig. 1 shows a display panel having apertures behind which rotates the variously colored disc, shown in Fig. 2, to produce movement of the eyes and mouth of the figure on the panel and the appearance and disappearance of an arrow associated with the figure.
Figure 2:
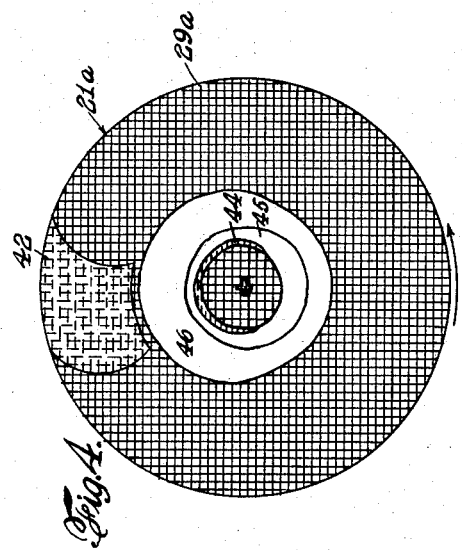

Referring to Figs. 3 and 4, the same principles are applied to this embodiment in a slightly different manner. The panel 20a bears the picture of a man in distress, as though with a bad headache. In addition to having apertures at the position of the eyes and of the lower jaw, this panel also has an aperture 40 at the top of the skull of the picture and above this an aperture 41 in the shape of a star formed in the background. The plate 21a has a black border 29a broken by a short segment of a bright color, such as yellow, at 42. For producing animation of the eyes this plate has a central eccentric area of solid black surrounded by a gray cresent 44 and a white area 45, more or less of the black area appearing as the plate rotates, in the upper portion of the eye apertures. Surrounding the color areas 44 and 45 is a band 46 of varying width which appears both in the lower jaw aperture and in the skull aperture, giving the skull an appearance of intermittent bulging of the top of the head with a simultaneous munching action of the mouth, a brilliant star appearing once in each rotation above the top of the head.

Referring to Figs. 5 and 6, a sign is shown comprising a panel 20b bearing the caricature of a man smoking a pipe, behind which rotates a plate 21b adapted to animate certain features of the picture on the panel 20b. The latter is provided with apertures 22, 24 and 25 at the eye and lower jaw portions of the face as in the figures previously described, and with an additional aperture in the form of a curved slot 48 extending upwardly through the background above the picture of the pipe. The plate 21b has an area 29b around part of its outer portion which is of the same color as the background surrounding aperture 48 and the balance thereof is white as shown at 49. These two segments alternately darken and illuminate the slot 48 giving the appearance of smoke curling upwardly from the pipe when the plate is rotated in the direction shown by the arrow. Centrally and eccentrically disposed within these parts 29b and 49 is a continuous black band 50 to animate the eyes, surrounded on both sides by white areas 51 and 52, the area 52 being surrounded by a red band 54 and an area 55 matching the coloration of the face on panel 20b. The band 54 and area 55 form the lower lip and lower jaw portions of the figure, being visible in part through aperture 25 in panel 20b.

Referring to Figs. 7 and 8, the display comprises a panel 20c and a plate 21c. In this embodiment, the figure is shown in the act of drinking from a glass through a straw or tube 60. The area within the picture of the glass and above the hands on either side of the tube 60 is cut out to form an aperture. The face is animated as in the other figures by a black band 61, a red band 62 surrounded by an area 64 matching the face. Around the periphery of the plate is an area 65 of gradually diminishing width which may be colored red, for example, to represent liquid within the glass, the wedge shape of this area, as the plate rotates, makes it appear that the liquid level in the glass is falling until it reaches the level of the hands, at which point it appears to refill suddenly and again empties. Simultaneously with this the figure, by reason of the apparent movement of the mouth, seems to be drinking.

Figs. 11 through 15 show various modes of mounting and rotating the movable plate or disc with reference to the fixed panel. In Figs. 11 and 12 the panel 20 is supported on a base 70 and spaced from it is a back 71, likewise mounted on the base. Rotatably mounted in the back is an arbor 72 which is fixed to the plate 21 at one end and is fixed in the hub 74 of a rotor having blades 75. Attached to the back 71 is an enclosure 76 for the rotor the top of which forms a tunnel open at its ends 78 and 79, the bottom part of the enclosure being semicircular. A stream of air passing through the tunnel portion of the enclosure will engage the uppermost blades 75 to turn the rotor, thus rotating plate 21 to animate the picture carried on the panel 20. The air stream may be produced by a fan or generated by the movement of a vehicle on which the display is mounted or the display may be set out in the open where the wind will operate it.

In Fig. 13, the panel 20 is similarly mounted on a base 80 which carries an upstanding bracket 81 having a bearing portion 82 in which is rotatably mounted an arbor 84 which carries the plate 21 at one end and a sheave 85 at the other. Disc 21 is rotated by a motor 86 mounted on the base.

Figs. 14 and 15 show a modified form of display having a hollow base 90 enclosing a motor 91 which drives a flanged wheel 92 which operates through an opening 94 in the base. Supported on the base 90 within a frame 95 are a pair of panels 20 forming a two-sided display. The rotating plate 21 will be appropriately colored on both sides so as to animate the display on each panel. The spacing between the panels 20 and disc 21 will preferably be closer than as shown in the drawing, in which the spaces are exaggerated for the sake of clarity. Plate 21 is supported at its bottom on the wheel 92 and is centered and further supported by a pair of flanged wheels 96 mounted on arbors 98 which are secured in the panels 20.

Where color has been referred to in the foregoing description, it will be understood to include black and white and it will be obvious that displays may be made embodying the principles above set forth which are made entirely of black, white and various tones of gray, as well as with colors in the strict sense of the term.

It is to be understood that the specific embodiments of the invention described above are merely illustrative and that the invention is not limited thereto but is to be construed broadly within the purview of the claims.

What is claimed is:

1. In an animated display, in combination, a stationary front plate having depicted thereon the major portions of a face, said plate having apertures encompassing the areas of the eyes of said face, a single rotatable rear plate mounted closely behind said front plate with its axis of rotation positioned between said apertures, the surface of said rear plate facing toward said front plate bearing an area of color having a continuous outer margin eccentric relative to said axis and surrounded by an area of contrasting color, said margin intersecting said apertures, and means for continuously rotating said rear plate whereby repetitive shifting of the eyes is produced by rotation of said rear plate.

2. In an animated display, in combination, a stationary front plate having depicted thereon the major portions of a face, said plate having apertures encompassing the areas of the eyes of said face, a single rotatable rear plate mounted closely behind said front plate with its axis of rotation positioned between said apertures, the surface of said rear plate facing toward said front plate bearing a continuous band of color positioned to show in part through said apertures and placed on a background of contrasting color and positioned eccentrically of said axis, and means for continuously rotating said rear plate whereby repetitive shifting of the eyes is produced by rotation of said rear plate.

3. In an animated display, in combination, a stationary front plate having depicted thereon the major portions of a face, said plate having an aperture encompassing the lower jaw portion of said face, a single rotatable rear plate mounted closely behind said front plate with its axis of rotation above said aperture, the surface of said rear plate facing toward said front plate bearing continuous discrete bands of color adapted in all positions to complete the lower jaw portion of said face but with varying facial expressions, the margins of said bands being eccentric relative to said axis, and a plurality of said bands being visible through said aperture, and means for continuously rotating said rear plate, whereby rotation of said rear plate gives to said face the appearance of chewing.

4. In an animated display, in combination, a stationary front plate having depicted thereon the major portions of a face, said plate having an aperture encompassing the lower jaw portion of said face and a pair of apertures encompassing the areas of the eyes of said face, a single rotatable rear plate mounted closely behind said front plate with its axis of rotation between said jaw aperture and said eye aperture, the surface of said rear plate facing toward said front plate bearing continuous discrete bands of color adapted in all positions to complete the lower jaw and eye portions of said face but with varying facial expressions, the margins of said bands being eccentric relative to said axis, and a plurality of said bands being visible through each of said apertures, and means for continuously rotating said rear plate, whereby rotation of said rear plate gives to said face the appearance of chewing.

JENS MURI.

REFERENCES CITED

The following references are of record in the file of this patent:

UNITED STATES PATENTS

| Number | Name | Date |
| --- | --- | --- |
| 787,109 | Pallidino | Apr. 11, 1905 |
| 1,598,497 | Oswald | Aug. 31, 1926 |
| 1,618,710 | Hose | Feb. 22, 1927 |
| 1,935,557 | Haag | Nov. 14, 1933 |
| 2,146,192 | Kraemer | Feb. 7, 1939 |
| 2,210,315 | De Verry | Aug. 6, 1940 |
| 2,295,430 | Seewald | Sept. 8, 1942 |